United States Patent [19]
Hoffmann et al.

[11] Patent Number: 4,801,383
[45] Date of Patent: Jan. 31, 1989

[54] SELECTIVE TWIST FILTRATION ROVING

[75] Inventors: Michael A. Hoffmann, Manchester, Md.; Robert J. Schmitt, Felton, Pa.

[73] Assignee: MEMTEC North America Corp., Timonium, Md.

[21] Appl. No.: 672,483

[22] Filed: Nov. 19, 1984

[51] Int. Cl.$^4$ .............................................. B01D 39/08
[52] U.S. Cl. ............................. 210/494.1; 210/497.1; 55/487; 19/236; 57/253; 242/54.4
[58] Field of Search .................. 210/457, 458, 497.01, 210/497.1, 494.1; 242/54.4, 55.1; 55/487, 253; 57/283; 19/236; 162/196

[56] References Cited

U.S. PATENT DOCUMENTS

| Re. 27,717 | 8/1973 | Breen et al. ........................... 57/283 |
| 1,751,000 | 3/1930 | Goldman ............................. 210/457 |
| 1,958,268 | 5/1934 | Goldman ............................. 210/238 |
| 2,368,216 | 1/1945 | Hastings et al. ................. 210/494.1 |
| 3,319,793 | 5/1967 | Miller, Jr. et al. .............. 210/497.1 |
| 3,334,752 | 8/1967 | Matravers ........................... 210/457 |
| 3,356,226 | 12/1967 | Miller, Jr. et al. ................ 210/497.1 |
| 3,624,779 | 11/1971 | Miller, Jr. et al. .................... 210/457 |
| 3,904,798 | 9/1975 | Vogt et al. ............................. 55/487 |
| 4,014,076 | 3/1977 | Slanik ..................................... 19/236 |
| 4,225,442 | 9/1980 | Tremblay et al. ............... 210/497.1 |

FOREIGN PATENT DOCUMENTS 2082466  8/1980  United Kingdom.

OTHER PUBLICATIONS

"Cartridge Filtration Guide", 1980, pp. 4–6.
"Dref OE System", para. 3.2 & 7.4, pictures 11, 12, 17, 18.

Primary Examiner—Richard V. Fisher
Assistant Examiner—Wanda L. Millard
Attorney, Agent, or Firm—James S. Waldron

[57] ABSTRACT

This invention relates to a filtration roving with the cross section of the roving exhibiting portions more tightly twisted than the remainder of the roving.

11 Claims, 6 Drawing Sheets

SELECTIVE TWIST FILTRATION ROVING

BACKGROUND OF THE INVENTION

1. Field of the Invention

This invention relates to a filtration roving with selected portions twisted more or less than other portions, to a new device for making such roving, to a new method for making such roving, and to wound filters employing such roving.

2. Description of Prior Art

Rovings are produced by spinning staple, textile fibers. In a particular type of unique spinning machine, fibers are fed to the area between two spinning drums. The drums rotate in the same direction at very high speed. The fibers cannot keep up with the drums and a twist is imparted to it creating a roving. Suction inserts in the drums themselves are utilized to pull the fibers down into the space between the drums, increasing the friction on the fibers thereby increasing the amount of twist.

To change the amount of twist various efforts have been made such as changing the amount of suction pressure constantly throughout the drums or by altering the drum speed. Although these methods do provide some adjustment in overall roving twist, they do not permit the selective variation of the twist of isolated sections of a roving.

For use in filtration, such as shown in U.S. Pats. Nos. 4,225,442; 3,624,779; 3,356,226; 3,319,793; and 2,368,216 an ideal roving would have a high enough amount of twist to impart sufficient strength to permit processing in the various winding mechanisms, but it would also have a low enough amount of twist to give sufficient bulk to the roving so that the desired filtration can be accomplished. It has generally been believed that there is a one-to-one trade off between bulk (low twist) and strength (high twist) and that some advantages of either must be compromised in any particular roving.

Bulk is important because increased roving bulk increases the amount of void space within a filter made with the roving in which particles can be trapped. Increased bulk reduces the amount of roving necessary to make a particular filter. Strength is important because a weak roving results in filter winding machine downtime when a roving breaks.

SUMMARY OF THE INVENTION

This invention is directed to a selectively twisted filtration roving in which various portions of the roving have a different amount of twist than other portions. In one embodiment the interior fibers of the roving are spun so that they have more twist than the remaining outer portions of the roving, producing a roving that has sufficient strength to withstand the subsequent winding operations but which has sufficient bulk to provide the desired filtration characteristics. According to this invention any portion of the roving inner, mid-area, or outer can have a higher or lower amount of twist imparted to it as desired.

Varied twist is achieved using the conventional spinning machine by varying only a chosen portion of the entire suction area within the spinning drums, rather than by simply changing the suction pressure across the entire drum, or by changing the drum speed. Each of the drums has a suction mechanism which provides suction along the drum length to hold fibers in the space between the spinning drums.

It has been discovered that different parts of the roving are formed at different points in the space between the drums. Quite surprisingly, it has also been discovered that by varying the suction pressure only at specific locations along the drum length, specific portions of the roving can be given an amount of twist different from other portions of the roving. The selective variation of pressure is accomplished by blocking off portions of the suction mechanism within the drums themselves, such as by employing plugs at various locations on the suction intake mechanism or by taping off desired portions on the intakes. It can also be accomplished by providing suction means which affect only part of the length of the drums, suction means that are not necessarily within the drums but adjacent to or beneath the space between the drums.

The use of selective twist rovings according to the present invention for filtration purposes greatly enhances the range of possible filtration parameters and in certain instances greatly reduces the cost of a particular filter. For example, a significantly lesser amount of raw material sliver can now be used to produce a selective twist roving filter with essentially the same filtration possibilities as a prior art filter which requires much more raw material.

It is therefore an object of the present invention to provide a selective twist roving in which different cross-sectional portions of the roving have differing amounts of twist.

Another object of the present invention is the provision of a machine to produce such a roving.

Yet another object of the present invention is the provision of a method to produce such a roving.

A further object of the present invention is the provision of a wound filter with such roving as filter media.

The foregoing and other objects, features and advantages of this invention will become more apparent from the following description of preferred embodiments and accompanying drawings.

DESCRIPTION OF PREFERRED EMBODIMENTS

Figure 1:
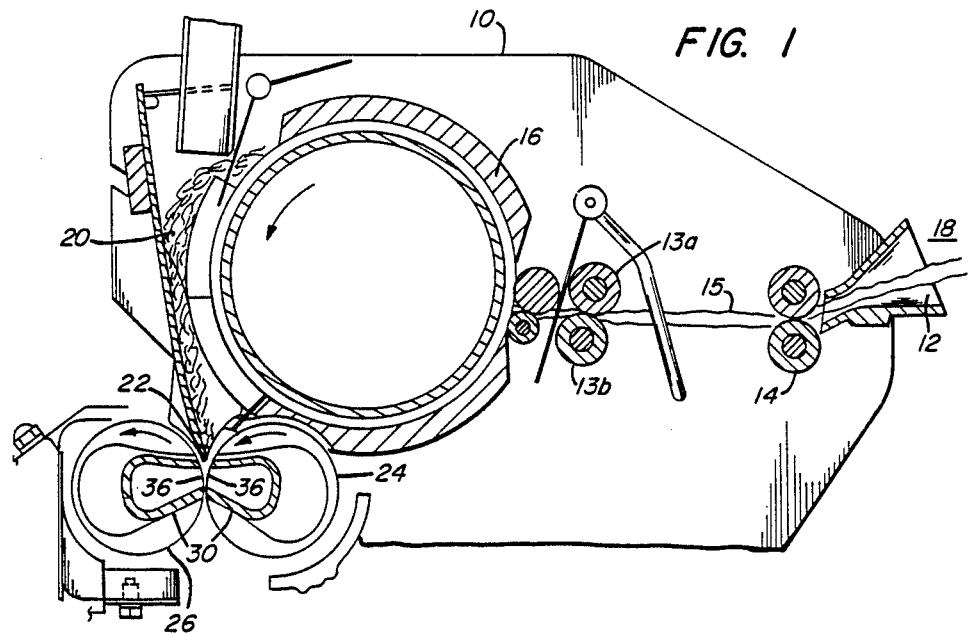
FIG. 1 is a cross-sectional view of one type of spinning machine.

One type of a unique prior art spinning machine 10 is shown in FIG. 1. This particular machine is a "DREF OE SYSTEM". Slivers 18 are introduced at the inlet 12 then fed, as a band of slivers 15, to the carding mechanism 16 by the feeding mechanism 14. The carding mechanism 16 expels individual staple fibers 20 which are then projected to the valley 22 between the spinning drum 24 and the spinning drum 26, each drum having a porous surface permitting suction therethrough. Each drum has a suction insert 30, which are not necessarily the same in configuration and function. These suction inserts 30 serve to suck fibers down into the valley or nip 22 between the drums 24, 26 and hold them there. As the fibers are spun the roving product 40 is taken from the right side of the drums (facing the drum end of the machine). The fibers are usually between 2 and 8 denier with fibers in the range of 2.5 to 4 denier preferred.

Figure 2:
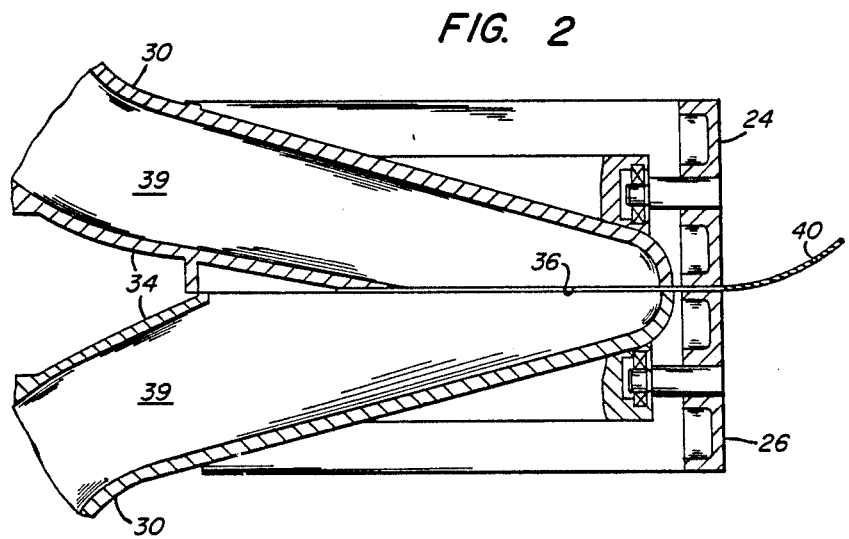
FIG. 2 is a cross-sectional view of the spinning drums and suction inserts of the machine of FIG. 1.
Figure 8:
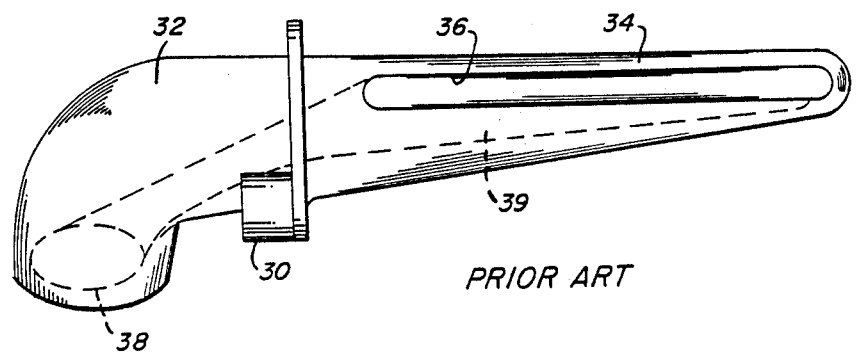
FIG. 8 is a perspective view of a conventional suction insert for the machine of FIG. 1.

As shown in FIG. 8, the inserts 30 have a body 32 with an arm 34. The arm 34 extends into a drum 24 or 26. Each arm 34 has a suction intake slot 36 extending along the length of the arm 34. Each arm 34 is hollow and has an opening 38 in its base which is connected to a vacuum or suction pressure source (not shown). The opening 38 communicates with the slot 36 by means of an inner channel 39 extending from the opening 38 to the slot 36. As shown in FIG. 2 the intake slots 36 extend across a substantial portion of the length of the drums 24, 26.

It was discovered that the fibers 20 entering the valley 22 beween the drums 24, 26 on the far left side (facing the drum end of the machine) became the center of the roving product. In other words, these fibers that entered the valley 22 at the far left side of the drums 24, 26 had to move all the way from left to right across the drums 24, 26 before exiting the valley 22; consequently, subsequently introduced fibers, i.e. fibers entering the valley 22 at mid-points or farther to the right, are entangled and twisted around the fibers introduced on the far left. Accordingly, the fibers introduced at the far right become the outer portions of the roving product.

Figure 6:
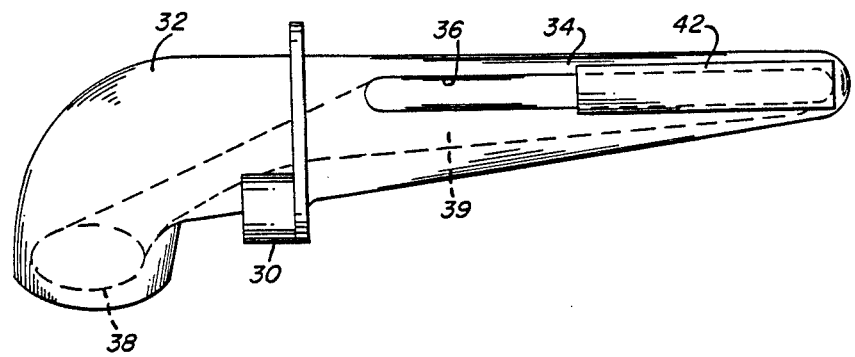
FIG. 6 is a perspective view of a suction insert according to the present invention.
Figure 7:
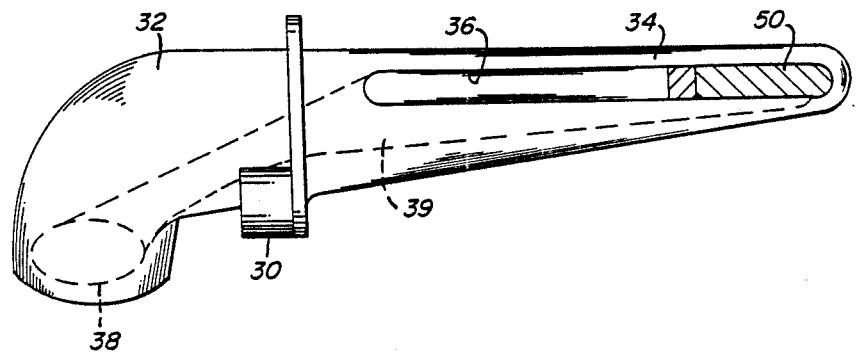
FIG. 7 is a perspective view of a suction insert according to the present invention.

The prior art does not teach any way to alter the amount of twist of only a selected cross-sectional portion of the roving product. It does teach variation in the twist of the entire product from interior fibers to exterior fibers by varying total pressure through the opening 38 and along the entire length of the slot 36 or by changing the drum rotation speed. It has been discovered, however, that the amount of twist of selected cross-sectional portions of the roving product can be altered by blocking off desired areas of the slot 36. Tape blocking means is shown in FIGS. 3–6 and plug blocking means 50 is shown in FIG. 7. The blocking means can either shut off all flow to a certain area or it can itself have pores, holes, or channels which permit partial suction in the area.

Figure 3:
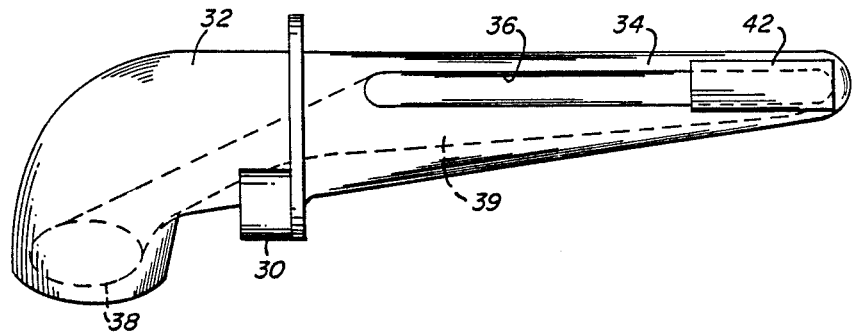
FIG. 3 is a perspective view of a suction insert according to the present invention.
Figure 11:
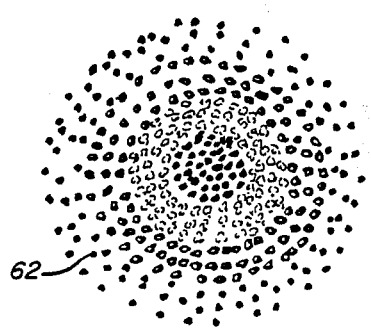
FIG. 11 is a cross-sectional schematic depiction of roving according to the present invention.

As shown in FIGS. 3–6, tape 42 is used to block off selected areas of the slot 36. Since the fibers fed into the valley 22 at the far right of the drums 24, 26 are affected by suction from the far right of the slot 36, when this area is blocked off, as shown in FIG. 3, those fibers are not sucked down into the valley 22 with the same force as the fibers farther to the left. Consequently, the fibers at the far right which will be on the outside of the roving product receive less twist. The roving that results has a bulkier, fuzzier outside as compared to standard full twist roving. This is depicted in FIGS. 9 and 11.

Figure 9:
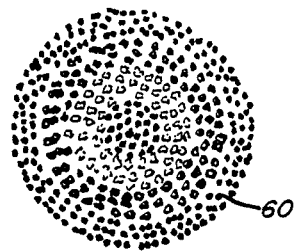
FIG. 9 is a cross-sectional schematic depiction of conventional roving wherein the dots represent fiber cross-sections.

FIG. 9 depicts a cross-sectional view of a standard full twist roving 60 made with none of the slot 36 blocked off. Along its length it is twisted and tight throughout. FIG. 11 on the other hand depicts roving 62 made with slots 36 partially blocked at the right end as shown in FIGS. 3 and 6. In FIG. 11 the center cross-sectional portion of the roving is tightly wound with more longitudinal twist relative to the lesser longitudinal twist of the outside fibers. FIGS. 3 and 6 show that the amount of blockage can be varied as desired to produce a roving with larger or smaller bulkier portions.

Figure 4:
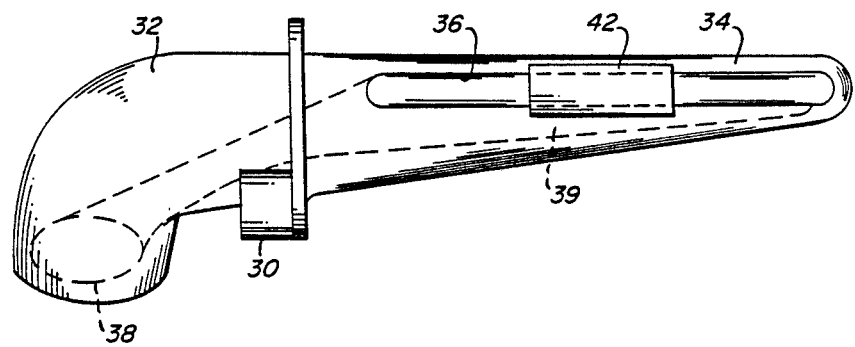
FIG. 4 is a perspective view of a suction insert according to the present invention.
Figure 5:
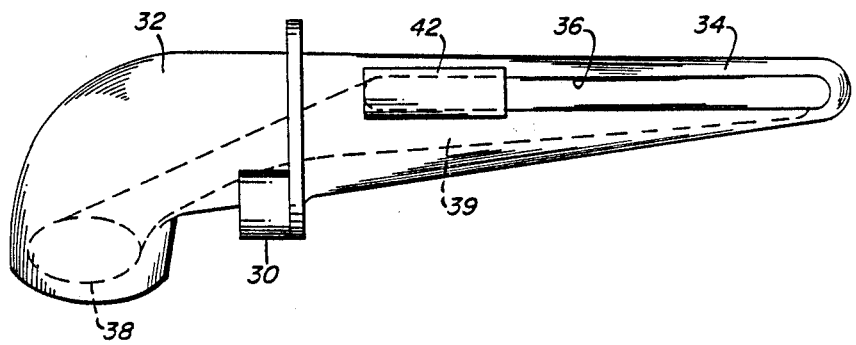
FIG. 5 is a perspective view of a suction insert according to the present invention.
Figure 10:
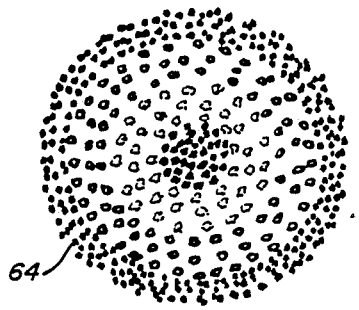
FIG. 10 is a cross-sectional schematic depiction of roving according to the present invention.

The roving produced by the arrangement shown in FIG. 4 is one in which the core fibers are tightly twisted; loosely twisted interior fibers; and tightly fiber twisted outer portions. Such a roving 64 is depicted in FIG. 10. If a roving with a loose center is desired, the arrangement shown in FIG. 5 would be used. Of course any desired roving can be produced by varying the amount and location of the blockage of the slots 36. Also, it is within the scope of this invention to partially block only one slot and leave the other insert's slot clear.

Applicants believe that the blockage of portions of the slot 36 tends to increase suction to some extent in other areas along the slot. It should be noted that it is within the scope of this invention to effect suction only at selected points along the valley 22 by providing suction means either adjacent to, above, or beneath the valley 22 which affect only a selected portion of the valley 22. This can be done by mounting appropriate conventional suction means of desired size and characteristics at desired locations along, above, or beneath the valley 22.

Figure 12:
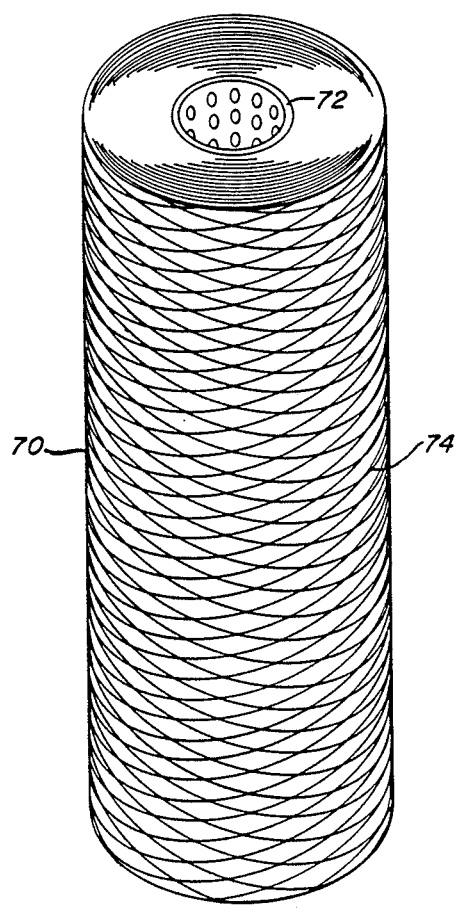
FIG. 12 is a perspective view of a filter according to the present invention.

A large variety of prior art filters utilize roving of various materials for filtration media. The present invention's roving can be used with any such prior art filter. The typical filter 70 as shown in FIG. 12 has a rigid pervious core 72 around which is wound in a typical "diamond" pattern roving 74 according to the present invention. In the instance in which a particular embodiment such as is shown in FIG. 11 is employed, it is possible to use significantly less roving and achieve substantially the same product as compared to prior art rovings. This represents a significant reduction in expense. The following comparison of a prior art filter and a dimensionally similar filter according to this invention shows that there is a significant reduction in the amount of fiber ("filter material") needed with this invention:

|  | 1S-S Standard Filter Cartridge (Prior Art) | 1S-L New Filter Cartridge (Present Invention) |
|---|---|---|
| Diameter | Approximately 2½" | Approximately 2½" |

-continued

|  | 1S-S Standard Filter Cartridge (Prior Art) | 1S-L New Filter Cartridge (Present Invention) |
|---|---|---|
| Length | Approximately 9¾" | Approximately 9¾" |
| Wind Pattern | "15 micron" wind pattern | "30 micron" wind pattern |
| Weight (Filter Material) | Approximately 198 grams | Approximately 110 grams |
| Weight (Core) | 29 grams | 29 grams |
| Filter Material | Polypropylene staple fiber, 3 denier, 144 to 172 grains per 12 yards | Polypropylene staple fiber, 3 denier, 160 to 180 grains per 12 yards |
| Air Test Permeability | Both Units substantially the same | Both units substantially the same |

For this particular filter there is a savings of about 88 grams or over 40%. Particulate retention for the two filters described above is substantially the same.

The increases in efficiency achieved with filters wound with the new roving is startling, particularly in view of the reduction in weight of roving used. In the following chart an entry after "Efficiency 90%" means that the filter cartridge will remove 90% of particles of the size listed. All entries for efficiencies are particle sizes in microns; for example an entry of 13.8±0.05 after "Efficiency 90%" means that that filter will remove 90% of all particles of a size of 13.8±0.05 microns or larger. The "Dirt Holding Capacity" indicates the amount in grams of particulate matter which the filter can trap before it can no longer perform effectively—it is a measure of the useful life of the filter.

|  | Standard Cartridge (Prior Art) | New Cartridges (Approx. 1" suction restricted at right end) | New Cartridges (Approx. 1½" suction restricted at right end) | New Cartridges (Approx. 2" suction restricted at right end) |
|---|---|---|---|---|
| Diameter | Approx. 2½" | same | same | same |
| Length | Approx. 9¾" | same | same | same |
| Weight (core) |  |  |  |  |
| Weight (Yarn) | 29 grams | same | same | same |
| Filter Yarn Material | 199.5 grams | 137.5 grams | 164.9 grams | 150.6 grams |
| Efficiency 90% | 13.8 ± .05 | 14.7 ± 3.5 | 13.1 ± 1.9 | 12.3 ± 0.8 |
| Efficiency 95% | 18.8 ± .06 | 18.2 ± 4.5 | 16.3 ± 2.5 | 15.0 ± 1.4 |
| Efficiency 98% | 28.6 ± 3.3 | 24.2 ± 6.4 | 22.7 ± 3.5 | 19.8 ± 2.8 |
| Dirt Holding Capacity | 84 ± 9 grams | 103 ± 8 grams | 91 ± 4 grams | 75 ± 7 grams |

In most instances shown in the chart above less filter material (roving) was required by filters according to this invention to do an equal or better job than the prior art filter. Also, with two embodiments shown above there was a significant increase in filter life. It should also be noted that despite the somewhat shorter life of the "2 inch restricted" filter, its efficiency was remarkably better than the prior art unit.

Tensile strength tests on the prior art rovings and a roving according to the present invention showed that while the new roving is not as strong as a standard full twist roving, it does have sufficient strength to be used in subsequent winding operations and it is significantly stronger than the prior art "fuzzy" exterior rovings. The following chart lists the strength test results. Columns c and d represent data for rovings produced with varied amounts of twist according to the teachings in the prior art instruction manual for a DREF OE SYSTEM.

Figure 13:
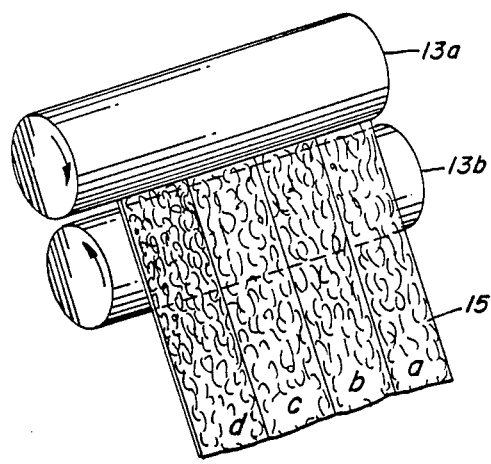
FIG. 13 is a top perspective view showing a band of slivers being fed to rollers in the machine of FIG. 1.
Figure 14:
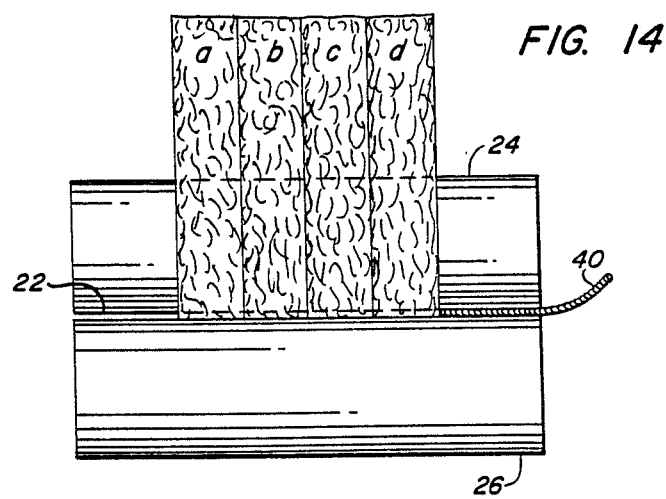
FIG. 14 is a top schematic view showing fibers from the various slivers of FIG. 13 entering the area between the spinning drums of the machine of FIG. 1, with like letters indicating sliver source from FIG. 13.

| a Prior Art | b Invention | c Prior Art | d Prior Art |
|---|---|---|---|
| 9.0 lbs. | 7.25 lbs. | 4.0 lbs. | 2.0 lbs. |
| 8.5 | 7.0 | 5.0 | .5 |
| 9.75 | 7.0 | 3.5 | 2.0 |
| 9.0 | 6.75 | 4.5 | 2.25 |
| 9.75 | 7.0 | 4.0 | .75 |
| 10.5 | 7.0 | 4.5 | 2.25 |
| 9.5 | 6.5 | 3.5 | 1.25 |
| 10.0 | 7.25 | 5.75 | 2.75 |
| 8.5 | 6.75 | 4.5 | 1.25 |
| 9.5 | 7.5 | 2.25 | 2.50 | a: Standard Prior Art Full Twist Roving
b: Roving according to invention - 2 inches of right side of suction intake slot blocked off
c: Roving produced with suction reduced across entire length of slot to achieve loose fuzzy exterior as in b above
d: Roving produced with reduced drum speed to achieve loose fuzzy exterior as in b above As shown in FIGS. 1 and 13 a plurality of individual slivers fed into the inlet 12 result in a band of slivers 15 being fed between the rollers such as 13a and 13b to the carding mechanism 16. Although the carding mechanism 16 pulls apart individual fibers, the character of the band 15 is substantially maintained so that the fiber feed to the drums 24 and 26 mirrors the sliver band 15, as shown in FIG. 14. Although there is some overlap of fibers from different slivers, the feed to the drums is such that fibers from sliver a that enter the left side (facing the drums) of the rollers 13a and 13b are fed to the left side (facing the drums) of the drums 24 and 26. Also, as already noted, the further to the left (facing the drums) that the fibers are fed to the valley 22, the more interiorly of the final product are those fibers located.

This phenomenon of band-sliver feed and feed to the drums has been demonstrated by feeding slivers of different color to the machine. In the resulting product, fibers of the color of the "a" sliver were innermost while those of the "d" sliver were outermost. The recognition of this phenomenom makes possible unique rovings and yarns which heretofore could not be made in this way. For example, slivers a, b, c, and d need not be identical. Slivers with different characteristics can be used to produce startling products including a vast array of so-called "novelty" yarns or rovings; for example, a plurality of slivers with different colors, different weights, different strengths, or different fiber size can be fed to the drums to produce different yarns or rovings. Products can even be produced with precisely located "slubs or "bumps" for decorative fabric use. Strong fibers can be fed in the "a" area to provide a strong center to the product and weaker yet fluffier fibers can be fed to "b", "c", and "d" areas to produce a product with strength and yet with a fuzzy exterior. Weights of the fibers can be varied to the limits acceptable by the machine. Steps, grooves or channels can be provided in the feed rollers of the machine if necessary to accommodate a bulkier sliver. Both natural (e.g. wool, cotton) and non-natural (synthetic) (e.g. rayon, nylon, dacron) fibers can be fed to the drums in alternate areas to produce a desired product. By feeding different density slivers, more fibers or less fibers can be fed to a selected area long the drums than to others to produce a product having a higher or lower fiber count in selected cross-sectional portions of the product.

Figure 15:
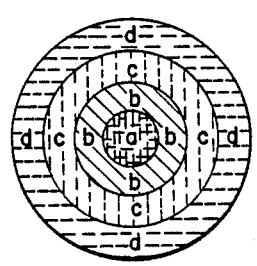
FIG. 15 is a schematic cross-sectional depiction of a spinning product using slivers such as in FIG. 13 and fibers as in FIG. 14, with letters corresponding to the letters in FIG. 14.

FIG. 15 demonstrates the correlation between the final location of fibers and the original slivers. FIG. 15 depicts schematically in cross-section a yarn or roving product as made with slivers, a, b, c, and d, as shown in FIGS. 13 and 14. The area labeled "a" in FIG. 15 shows the final position of fibers from the "a" sliver.

The purpose of this invention is to be able to make different types of yarns, rovings, or spun textile staple fiber products, one embodiment being a filtration roving with a fuzzy outside and sufficient strength to withstand winding operations yet which is made with less fibers than prior art products. The teachings of this invention are meant to include in their scope and spirit yarns, rovings and other spun textile staple fiber products. While the presently preferred embodiments of the invention have been given for purposes of disclosure, changes in details of method and structure which are the invention's equivalents may be resorted to without departing from the spirit and scope of the invention as defined in the following claims:

What is claimed is:

1. A filter comprising
   rigid pervious core means through which fluid to be filtered can flow,
   filter media means for filtering the fluid, the filter media means covering a portion of said core means,
   the filter media means comprising filtration roving consisting of a twisted unitary strand which, in crosssection, exhibits portions more tightly twisted than the remainder of the roving.

2. The filter of claim 1 wherein the filtration roving has an inner portion that is more tightly twisted than the remaining outer portion.

3. The filter of claim 1 wherein the filtration roving has an inner and an outer portion which are more tightly twisted than the remaining middle portion.

4. The filter of claim 1 wherein the filtration roving has an inner and a middle portion which are more tightly twisted than the remaining outer portion.

5. A filter comprising
   rigid pervious core means through which fluid to be filtered can flow,
   filter media means for filtering the fluid, the filter media means covering a portion of said core means, and
   the filter media means comprising a twisted unitary strand filtration roving in which selected fibers comprising selected portions of the roving are subjected to greater negative pressure between spinning drums used to make the roving than other fibers comprising the non-selected portions of the roving.

6. In a filter comprising a rigid, pervious core and filter media surrounding at least a portion of said core, said filter media composed of filtration roving wound around the core,
   the improvement wherein said roving consists of a twisted unitary strand and, in cross-section, is characterized by an outer region of comparatively bulky twisted fiber and an inner region formed of fibers more tightly twisted than said outer region fibers.

7. The filter of claim 6, in which the degree of twist from the outermost region fibers to the innermost region fibers increases in a continuous manner.

8. The filter of claim 6, in which said roving is produced by feeding fibers into a valley-shaped space formed between parallel aligned, closely spaced, counter-rotated suction drums, each of which contains an axially extending suction slot which faces said valley-shaped space, and restricting the portion of said suction slots near which the roving exits from said drums, to produce the bulky outer region of the roving.

9. The filter of claim 8, in which approximately one to two inches of the suction slot is restricted at the right end thereof.

10. The filter of claim 8, in which said slot portion is completely blocked.

11. The filter of claim 9, in which said approximately one to two inches of slot is completely blocked.

* * * * *